United States Patent
Ma et al.

(10) Patent No.: US 11,129,177 B2
(45) Date of Patent: Sep. 21, 2021

(54) CROSS-CARRIER SCHEDULING METHOD AND DEVICE

(71) Applicant: CHINA ACADEMY OF TELECOMMUNICATIONS TECHNOLOGY, Beijing (CN)

(72) Inventors: Teng Ma, Beijing (CN); Rui Zhao, Beijing (CN)

(73) Assignee: CHINA ACADEMY OF TELECOMMUNICATIONS TECHNOLOGY, Beijing (CN)

(*) Notice: Subject to any disclaimer, the term of this patent is extended or adjusted under 35 U.S.C. 154(b) by 53 days.

(21) Appl. No.: 16/346,688

(22) PCT Filed: Nov. 1, 2017

(86) PCT No.: PCT/CN2017/108865
§ 371 (c)(1),
(2) Date: May 1, 2019

(87) PCT Pub. No.: WO2018/082553
PCT Pub. Date: May 11, 2018

(65) Prior Publication Data
US 2019/0281612 A1    Sep. 12, 2019

(30) Foreign Application Priority Data
Nov. 4, 2016 (CN) .......................... 201610963586.0

(51) Int. Cl.
*H04W 72/12* (2009.01)
*H04W 72/04* (2009.01)
*H04L 5/00* (2006.01)

(52) U.S. Cl.
CPC .......... *H04W 72/1257* (2013.01); *H04L 5/00* (2013.01); *H04W 72/042* (2013.01);
(Continued)

(58) Field of Classification Search
None
See application file for complete search history.

(56) References Cited

U.S. PATENT DOCUMENTS

| 2013/0028205 A1* | 1/2013 | Damnjanovic ....... H04L 5/0058 370/329 |
| 2015/0071207 A1 | 3/2015 | Seo et al. |

(Continued)

FOREIGN PATENT DOCUMENTS

| CN | 103944701 A | 7/2014 |
| CN | 105188045 A | 12/2015 |

(Continued)

OTHER PUBLICATIONS

International Search Report PCT/ISA/210 for International Application No. PCT/CN2017/108865 dated Jan. 29, 2018.

(Continued)

*Primary Examiner* — Saad Khawar
(74) *Attorney, Agent, or Firm* — Harness, Dickey & Pierce, P.L.C.

(57) ABSTRACT

A cross-carrier scheduling method and a cross-carrier scheduling device are provided. The cross-carrier scheduling method includes receiving a cross-carrier scheduling indication transmitted from a base station via a first carrier; determining a cross-carrier scheduling time indicated by the base station according to the cross-carrier scheduling indication; adding a delay time to the cross-carrier scheduling time to obtain an actual cross-carrier scheduling time; and performing communication between user equipment by using a second carrier during the actual cross-carrier scheduling time.

11 Claims, 7 Drawing Sheets

(52) U.S. Cl.
CPC ... *H04W 72/0446* (2013.01); *H04W 72/0453* (2013.01); *H04W 72/0493* (2013.01); *H04W 72/1289* (2013.01); *H04L 5/0053* (2013.01)

(56) References Cited

U.S. PATENT DOCUMENTS

2018/0019904 A1\* 1/2018 Lee .................. H04L 5/0053
2018/0167904 A1\* 6/2018 Lee .................. H04W 56/0045

FOREIGN PATENT DOCUMENTS

| CN | 105340349 A | 2/2016 |
|---|---|---|
| CN | 105721114 A | 6/2016 |
| EP | 3024165 A1 | 5/2016 |
| EP | 3 242 520 A1 | 11/2017 |
| EP | 3 288 321 A1 | 2/2018 |
| WO | WO-2016/108680 A1 | 7/2016 |
| WO | WO-2016/171471 A1 | 10/2016 |

OTHER PUBLICATIONS

Extended European Search Report dated Sep. 26, 2019 for Application No. EP 17 86 7695.

\* cited by examiner

CROSS-CARRIER SCHEDULING METHOD AND DEVICE

CROSS-REFERENCE TO RELATED APPLICATION

This application is the U.S. national phase of PCT Application No. PCT/CN2017/108865 filed on Nov. 1, 2017, which claims priority to Chinese Patent Application No. 201610963586.0 filed on Nov. 4, 2016, the disclosures of each of which are incorporated in their entirety by reference herein.

TECHNICAL FIELD

The present disclosure relates to the field of communication technology, and in particular to a cross-carrier scheduling method and a cross-carrier scheduling device.

BACKGROUND

In adopted standards of an Internet of Vehicles system, a new downlink control information (DCI) domain includes contents shown in Table 1 as follows, where u represents subchannel numbers corresponding to different bandwidths:

TABLE 1

| DCI of Internet of Vehicles | Bit |
|---|---|
| Carrier indication field (CIF) | 3 |
| Minimum indication of subchannel allocation | $\lceil \log_2 (u) \rceil$ |
| Improved frequency resource location | $\lceil \log_2 (u(u + 1)/2) \rceil$ |
| Time interval between initial transmission and retransmission | 4 |
| Semi-persistent scheduling (SPS) configuration indication | 3 |
| SPS activation/release indication | 1 |

In order to be compatible with all standards, it should be ensured that DCI in the Internet of Vehicles has a same length as previous DCI format 0/1A. Therefore, zeros need to be added to the DCI of the Internet of Vehicles, so as to ensure the identical lengths. If it is necessary to subsequently use the added zeros for other purposes, the zeros may be replaced with other information domains.

In a mode of time-division duplexing (TDD), which is a full-duplex communication technique adopted in a mobile communication system, when user equipment (UE) detects that a physical downlink control channel (PDCCH)/enhanced physical downlink control channel (EPDCCH) is in an $n^{th}$ subframe, backward adjustment is made by k subframes to perform cross-carrier communication, that is, in the $(n+k)^{th}$ subframe. For values of k, see following Table 2 (values of k under TDD configurations 0-6):

TABLE 2

| TDD Uplink/Downlink Configuration | Subframe Number | | | | | | | | | |
|---|---|---|---|---|---|---|---|---|---|---|
| | 0 | 1 | 2 | 3 | 4 | 5 | 6 | 7 | 8 | 9 |
| 0 | | 4 | 6 | | | | 4 | 6 | | |
| 1 | | | 6 | | 4 | | | 6 | | 4 |
| 2 | | | 4 | | | | | 4 | | |
| 3 | 4 | | | | | | | 4 | 4 | |
| 4 | | | | | | | | | 4 | 4 |
| 5 | | | | | | | | | 4 | |
| 6 | 7 | 7 | | | | 7 | 7 | | | 5 |

In conjunction with configurations in following Table 3 (TDD uplink-downlink configuration table), and analysis of transmission subframes of all TDD uplink and downlink configurations 0-6, as shown in FIG. 1, when PC5 subframes dedicated to Intelligent Transportation Systems (ITS) in Sidelink is subject to cross-carrier scheduling by cellular network Uu, a user can only schedule PC5 subframes V corresponding to uplink subframes U through downlink subframes D and special subframes S, but cannot schedule PC5 subframes V corresponding to every downlink subframe and every special subframe (such as subframes V with stripped backgrounds in FIG. 1), which causes resource waste of some subframes in a time domain.

TABLE 3

| Uplink-Downlink Configuration | Uplink to Downlink Period of Switching Point | Subframe Number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

SUMMARY

An objective of the present disclosure is to provide a cross-carrier scheduling method and a cross-carrier scheduling device, so as to solve the technical problem of resource waste of some subframes in a time domain in existing cross-carrier scheduling.

In order to achieve the above objective, embodiments of the present disclosure provide a cross-carrier scheduling method, comprising:

receiving a cross-carrier scheduling indication transmitted from a base station via a first carrier;

determining a cross-carrier scheduling time indicated by the base station according to the cross-carrier scheduling indication;

adding a delay time to the cross-carrier scheduling time to obtain an actual cross-carrier scheduling time; and performing communication between user equipment by using a second carrier during the actual cross-carrier scheduling time.

Wherein, before the step of adding a delay time to the cross-carrier scheduling time to obtain an actual cross-carrier scheduling time, the cross-carrier scheduling method comprises:

obtaining a next cross-carrier scheduling time indicated by the base station according to a subframe and a structure of transmission frame by which the cross-carrier scheduling indication is transmitted; and determining a value of a delay time according to a time interval between the cross-carrier scheduling time and the next cross-carrier scheduling time.

Wherein, the step of receiving a cross-carrier scheduling indication transmitted from a base station via a first carrier comprises:

receiving DCI transmitted through PDCCH/EPDCCH via a first carrier; and obtaining a cross-carrier scheduling indication carried in the DCI, wherein the cross-carrier scheduling indication occupies at least 2 bits in the DCI.

Wherein, the step of receiving DCI transmitted through PDCCH/EPDCCH via a first carrier comprises:

receiving DCI transmitted through PDCCH/EPDCCH by all downlink subframes and special subframes via a first carrier.

Wherein, a length of the DCI is determined based on a sum of a basic information bit length under a maximum bandwidth and a preset scheduling bit length, and also based on a maximum value of a maximum format length under a current bandwidth; wherein the basic information bit length is equal to a length of DCI format 5A, the maximum format length is equal to a length of DCI format 0, and the preset scheduling bit length includes 3 bits of SPS configuration indication and 1 bit of SPS activation/release indication.

In order to achieve the above objective, the embodiments of the present disclosure further provide a cross-carrier scheduling device, comprising:

a receiving module, configured to receive a cross-carrier scheduling indication transmitted from a base station via a first carrier;

a first determination module, configured to determine a cross-carrier scheduling time indicated by the base station according to the cross-carrier scheduling indication;

a first processing module, configured to add a delay time to the cross-carrier scheduling time to obtain an actual cross-carrier scheduling time; and a communication module, configured to perform communication between user equipment by using a second carrier during the actual cross-carrier scheduling time.

Wherein, the cross-carrier scheduling device further comprises:

a second processing module, configured to obtain a next cross-carrier scheduling time indicated by the base station according to a subframe and a structure of transmission frame by which the cross-carrier scheduling indication is transmitted; and a second determination module, configured to determine a value of a delay time according to a time interval between the cross-carrier scheduling time and the next cross-carrier scheduling time.

Wherein, the receiving module comprises:

a receiving sub-module, configured to receive DCI transmitted through PDCCH/EPDCCH via a first carrier; and an acquisition sub-module, configured to obtain a cross-carrier scheduling indication carried in the DCI, wherein the cross-carrier scheduling indication occupies at least two bits in the DCI.

Wherein, the receiving sub-module comprises:

a receiving unit, configured to receive DCI transmitted through PDCCH/EPDCCH by all downlink subframes and special subframes via a first carrier.

Wherein, a length of the DCI is determined based on a sum of a basic information bit length under a maximum bandwidth and a preset scheduling bit length, and also based on a maximum value of a maximum format length under a current bandwidth; wherein the basic information bit length is equal to a length of DCI format 5A, the maximum format length is equal to a length of DCI format 0, and the preset scheduling bit length includes 3 bits of SPS configuration indication and 1 bit of SPS activation/release indication.

The embodiments of the present disclosure further provide a cross-carrier scheduling device, comprising a transceiver, a processor, and a memory configured to store data used by the processor while performing operations, wherein:

the transceiver is configured to receive a cross-carrier scheduling indication transmitted from a base station via a first carrier;

the processor is configured to determine a cross-carrier scheduling time indicated by the base station according to the cross-carrier scheduling indication, and add a delay time to the cross-carrier scheduling time to obtain an actual cross-carrier scheduling time; and the transceiver is further configured to perform communication between user equipment by using a second carrier during the actual cross-carrier scheduling time obtained by the processor.

The embodiments of the present disclosure further provide a computer readable storage medium, on which is stored instructions for executing following steps:

receiving a cross-carrier scheduling indication transmitted from a base station via a first carrier;

determining a cross-carrier scheduling time indicated by the base station according to the cross-carrier scheduling indication;

adding a delay time to the cross-carrier scheduling time to obtain an actual cross-carrier scheduling time; and performing communication between user equipment by using a second carrier during the actual cross-carrier scheduling time.

The above technical solutions of the present disclosure produce beneficial effects as follows:

with the cross-carrier scheduling methods of the embodiments of the present disclosure, after receiving a cross-carrier scheduling indication transmitted from a base station via a first carrier, user equipment determines a cross-carrier scheduling time indicated by the base station according to the cross-carrier scheduling indication, then adds a delay time to the cross-carrier scheduling time indicated by the base station to obtain an actual cross-carrier scheduling time, and finally uses a second carrier to communicate with other UE during the actual cross-carrier scheduling time. By adding a delay time to compensate for the cross-carrier scheduling time indicated by the base station, the scheduling time is increased in length, thereby improving system resource utilization.

BRIEF DESCRIPTION OF THE DRAWINGS

In order to clearly illustrate the technical solutions of embodiments of the present disclosure, drawings required for description of the embodiments of the present disclosure will be simply introduced below. Obviously, the drawings introduced below are just for some embodiments of the present disclosure, and other drawings may be obtained based on the drawings introduced below by those skilled in the art without any creative work.

DETAILED DESCRIPTION

The technical solutions of the embodiments of the present disclosure will be described hereinafter in details in conjunction with the drawings of the embodiments of the present disclosure. Obviously, the embodiments described hereinafter are only some embodiments of the present disclosure, but do not include all the embodiments. Based on the embodiments of the present disclosure, all other embodiments obtained by those skilled in the art without any creative work should be considered to fall within the protection scope of the present disclosure.

First Embodiment

Figure 2:
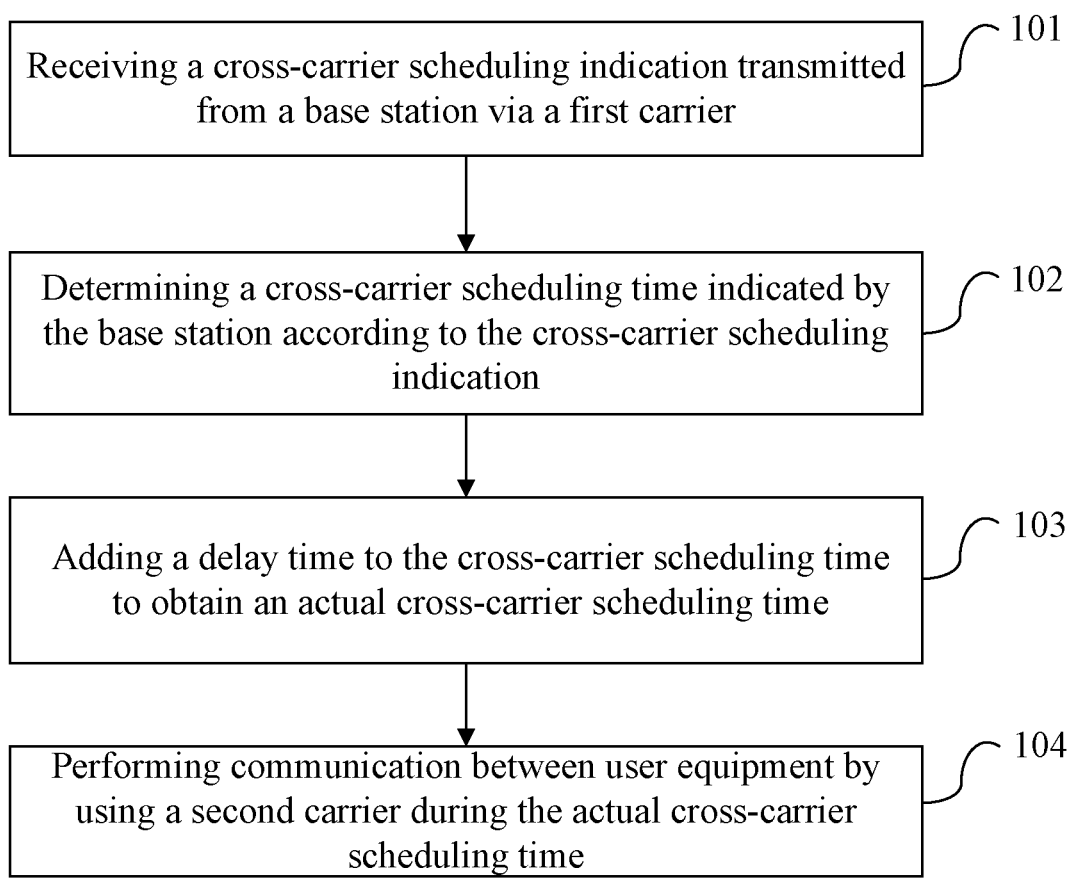
FIG. 2 is a flow chart illustrating steps of a cross-carrier scheduling method according to First Embodiment of the present disclosure.

As shown in FIG. 2, a cross-carrier scheduling method according to First Embodiment of the present disclosure comprises:

Step 101, receiving a cross-carrier scheduling indication transmitted from a base station via a first carrier;

Step 102, determining a cross-carrier scheduling time indicated by the base station according to the cross-carrier scheduling indication;

Step 103, adding a delay time to the cross-carrier scheduling time to obtain an actual cross-carrier scheduling time; and Step 104, performing communication between user equipment by using a second carrier during the actual cross-carrier scheduling time.

With Steps 101-104, user equipment UE (also called "terminal") receives a cross-carrier scheduling indication transmitted from a base station eNB via a first carrier used for communication with the eNB, then determines a cross-carrier scheduling time indicated by the eNB according to the cross-carrier scheduling indication, then adds a delay time to the cross-carrier scheduling time to obtain an actual cross-carrier scheduling time, and finally uses a second carrier, which is used for communication with other UE, to communicate during the actual cross-carrier scheduling time. By adding a delay time to the cross-carrier scheduling time as compensation, the scheduling time is increased in length, thereby improving system resource utilization.

For example, UE communicates with eNB by means of TDD, the UE receives a cross-carrier scheduling indication under a Uu carrier; after obtaining an actual cross-carrier scheduling time, the UE communicates with other UE by using a resource of PC5 carrier dedicated to ITS during the actual cross-carrier scheduling time.

Figure 3:
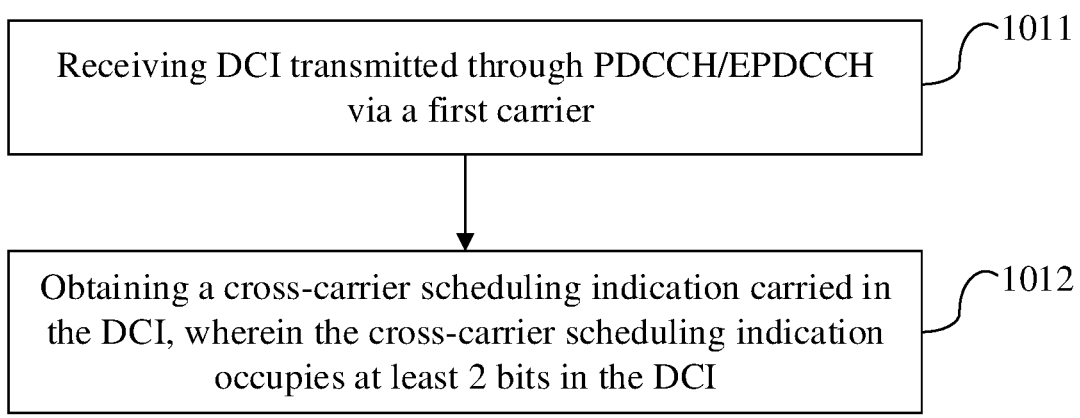
FIG. 3 is a flow chart I illustrating specific steps of the cross-carrier scheduling method according to the First Embodiment of the present disclosure.

Specifically, as shown in FIG. 3, Step 101 comprises:

Step 1011, receiving DCI transmitted through PDCCH/EPDCCH via a first carrier; and Step 1012, obtaining a cross-carrier scheduling indication carried in the DCI, wherein the cross-carrier scheduling indication occupies at least 2 bits in the DCI.

It can be known from the above that, in the embodiment, the cross-carrier scheduling indication is carried in the DCI, that is, the cross-carrier scheduling indication occupies at least 2 bits in the DCI. Since DCI is usually carried through PDCCH/EPDCCH, like Steps 1011 and 1012, the DCI transmitted through PDCCH/EPDCCH is received via the first carrier, and the cross-carrier scheduling indication is obtained from the DCI.

Figure 1:
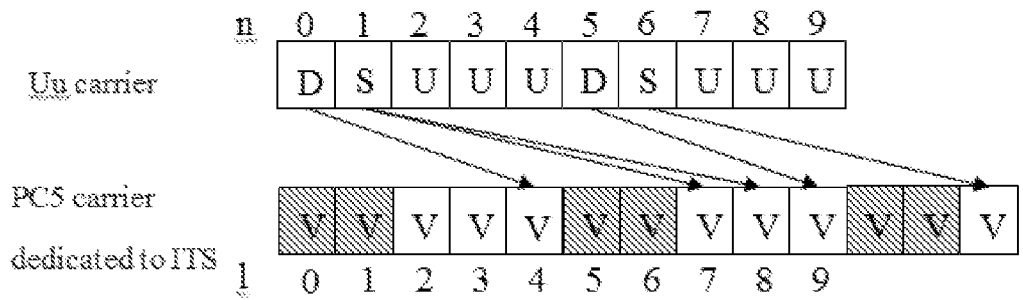
FIG. 1 is a schematic diagram illustrating existing scheduling of a transmission subframe structure under TDD configuration of 0.

Taking the same example, the UE communicates with the eNB by means of TDD, as shown in Table 2, a cross-carrier scheduling time indicated by the base station may be further determined according to current TDD configuration (TDD configurations 0-6) and the received cross-carrier scheduling indication. If the current TDD configuration is 0, according to Tables 2 and 3, a transmission subframe structure is "DSUUUDSUUU" as shown in FIG. 1, when the received cross-carrier scheduling indication is in a downlink subframe D with a subframe number n=0, backward adjustment is made by k=4 subframes, that is, in a subframe with 1=4 pointed by an arrow, and it may be determined that the cross-carrier scheduling time indicated by the base station is in a subframe obtained by backward adjustment of k subframes.

As shown in FIG. 2, after the cross-carrier scheduling time is determined, the next step is to add a delay time to the cross-carrier scheduling time so as to obtain an actual cross-carrier scheduling time.

As mentioned above, the cross-carrier scheduling indication occupies at least 2 bits in the DCI, m subframes may be added based on backward adjustment of k subframes according to a value of bits occupied by the cross-carrier scheduling indication, that is, the UE communicates with other UE in a PC5 subframe corresponding to a Uu subframe with a subframe number of n+k+m. If the cross-carrier scheduling indication occupies 2 bits in the DCI, a value range of m is [0, 3] as shown in Table 4 below; and if the cross-carrier scheduling indication occupies 3 bits in the DCI, a value range of m is [0, 7].

TABLE 4

| 2 bits | m |
|---|---|
| 00 | 0 |
| 01 | 1 |

TABLE 4-continued

| 2 bits | m |
|---|---|
| 10 | 2 |
| 11 | 3 |

It should be understood that not all of the downlink subframes and special subframes among Uu subframes have a cross-carrier scheduling function in the embodiment. In this case, it is possible to preset that the cross-carrier scheduling indication occupies 4 bits in the DCI, and correspondingly a value range of m is [0, 15], so that the downlink subframes D and special subframes S among Uu subframes, which have a cross-carrier scheduling function, will schedule all the PC5 subframes when m has a maximum value.

Figure 4:
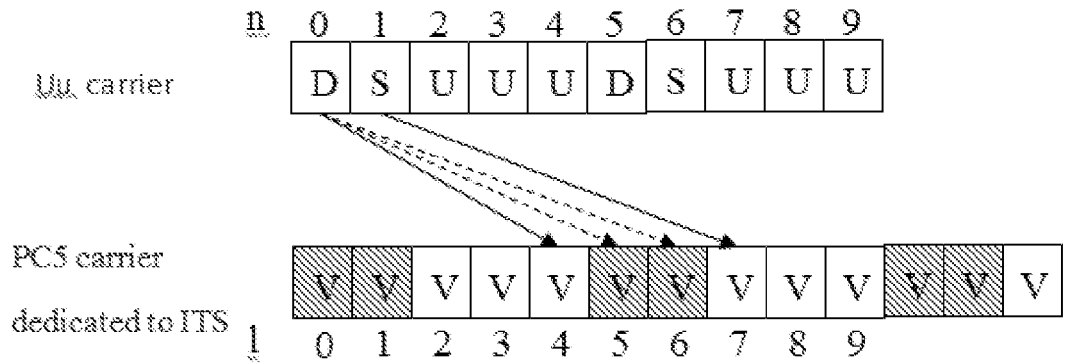
FIG. 4 is a schematic diagram illustrating scheduling of the transmission subframe structure under TDD configuration of 0 by using the cross-carrier scheduling method according to the First Embodiment of the present disclosure.
Figure 5:
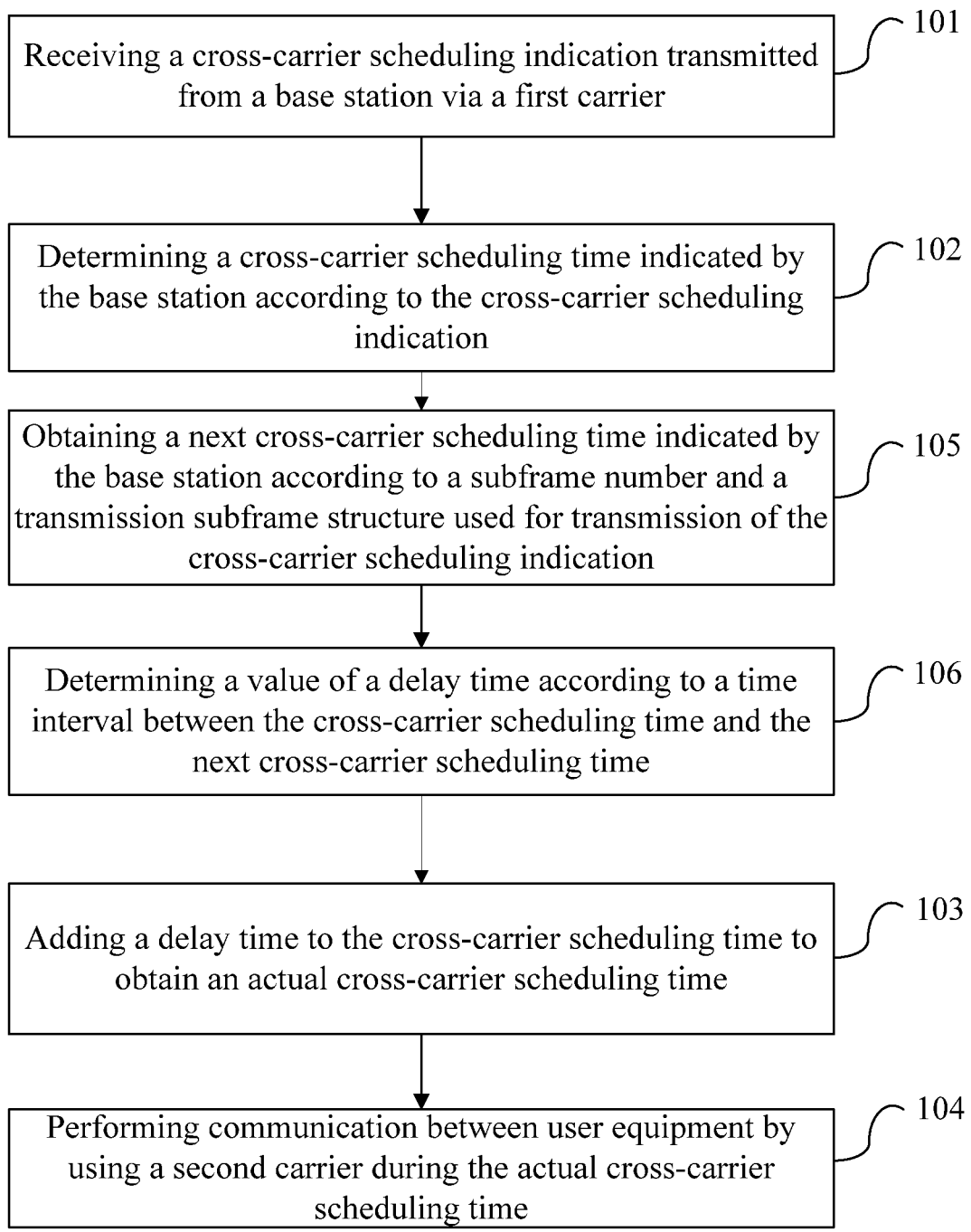
FIG. 5 is a flow chart II illustrating specific steps of the cross-carrier scheduling method according to the First Embodiment of the present disclosure.

However, due to transmission subframe structures of the UE and the eNB, a time interval between two consecutive cross-carrier scheduling times indicated by the base station usually fails to reach some larger values of m, for example, there are only two subframes between PC5 subframes pointed by two adjacent solid arrows in FIG. 4. Therefore, as shown in FIG. 5, based on the above embodiment, there are following steps before Step 103:

Step 105, obtaining a next cross-carrier scheduling time indicated by the base station according to a subframe and a structure of transmission frame by which the cross-carrier scheduling indication is transmitted; and Step 106, determining a value of a delay time according to a time interval between the cross-carrier scheduling time and the next cross-carrier scheduling time.

With Steps 105 and 106, a next cross-carrier scheduling time indicated by the base station is first obtained based on a subframe number and a transmission subframe structure used for transmission of the cross-carrier scheduling indication received in Step 101, and then a value of a delay time is determined according to a time interval between the cross-carrier scheduling time and the next cross-carrier scheduling time, so as to actualize optimal utilization of system resources.

Referring still to the above example, the cross-carrier scheduling indication currently received is in the downlink subframe D with a subframe number n=0, and it is determined that the cross-carrier scheduling time indicated by the base station is in the subframe by backward adjustment of k=4 subframes, that is, in the subframe with l=4 pointed by the arrow. In such case, according to a transmission subframe structure shown in FIG. 4, the next cross-carrier scheduling indication received is in a special subframe S with a subframe number n=1, and it is determined that the next cross-carrier scheduling time indicated by the base station is in the subframe by backward adjustment of k=6 subframes, that is, in a subframe with l=7 pointed by an arrow. There is a time interval of only 2 subframes between the two cross-carrier scheduling times, so that a maximum value of m is 2, and a value range of m is [0, 2]. So, when the cross-carrier scheduling indication currently received is in the downlink subframe D with a subframe number n=0, UE may communicate with other UE by using PC5 resource in a PC5 subframe corresponding to a Uu subframe with a subframe number of n+k+m=0+4+m, that is, not only in a PC5 subframe with l=4 but also in PC5 subframes with l=5 and l=6, which avoids repeated processing when m is limited to a maximum value.

Furthermore, in the embodiment, a length of the DCI is determined based on a sum of a basic information bit length under a maximum bandwidth and a preset scheduling bit length, and also based on a maximum value of a maximum format length under a current bandwidth; wherein the basic information bit length is equal to a length of DCI format 5A, the maximum format length is equal to a length of DCI format 0, and the preset scheduling bit length includes 3 bits of SPS configuration indication and 1 bit of SPS activation/release indication.

As shown in following Table 5 applicable to determination of a length of DCI under a bandwidth of 1.4 MHz, according to the above content, it is first determined that a basic information bit length (a length of DCI format 5A) is 20 bits under a maximum bandwidth of 20 MHz, and a preset scheduling bit length (3 bits of SPS configuration indication and 1 bit of SPS activation/release indication) is 4 bits, so that the sum is 24 bits; and a maximum format length (a length of DCI format 0) is 21 bits under the bandwidth of 1.4 MHz, so that the maximum value of 24 bits is taken as the length of DCI.

TABLE 5

| | Bandwidth | | | | | |
|---|---|---|---|---|---|---|
| | 1.4 MHz | 3 MHz | 5 MHz | 10 MHz | 15 MHz | 20 MHz |
| Length of DCI format 5A (bit) | 7 | 12 | 14 | 17 | 18 | 20 |
| Length of DCI format 0/1A (bit) | 21 | 22 | 25 | 27 | 27 | 28 |
| Length of DCI format (bit) | 24 | 24 | 25 | 27 | 27 | 28 |

In summary, according to the cross-carrier scheduling method of the First Embodiment of the present disclosure, after receiving a cross-carrier scheduling indication transmitted from the eNB via a first carrier, the UE determines a cross-carrier scheduling time indicated by the eNB according to the cross-carrier scheduling indication, then adds a delay time to the cross-carrier scheduling time indicated by the eNB to obtain an actual cross-carrier scheduling time, and finally uses a second carrier to communicate with other UE during the actual cross-carrier scheduling time. By adding a delay time to compensate for the cross-carrier scheduling time indicated by the eNB, the scheduling time is increased in length and idle resources are effectively used, thereby improving the system resource utilization. Certainly, the cross-carrier scheduling method of the embodiment may also be applied in FDD mode, which will not be described herein.

Second Embodiment

Figure 6:
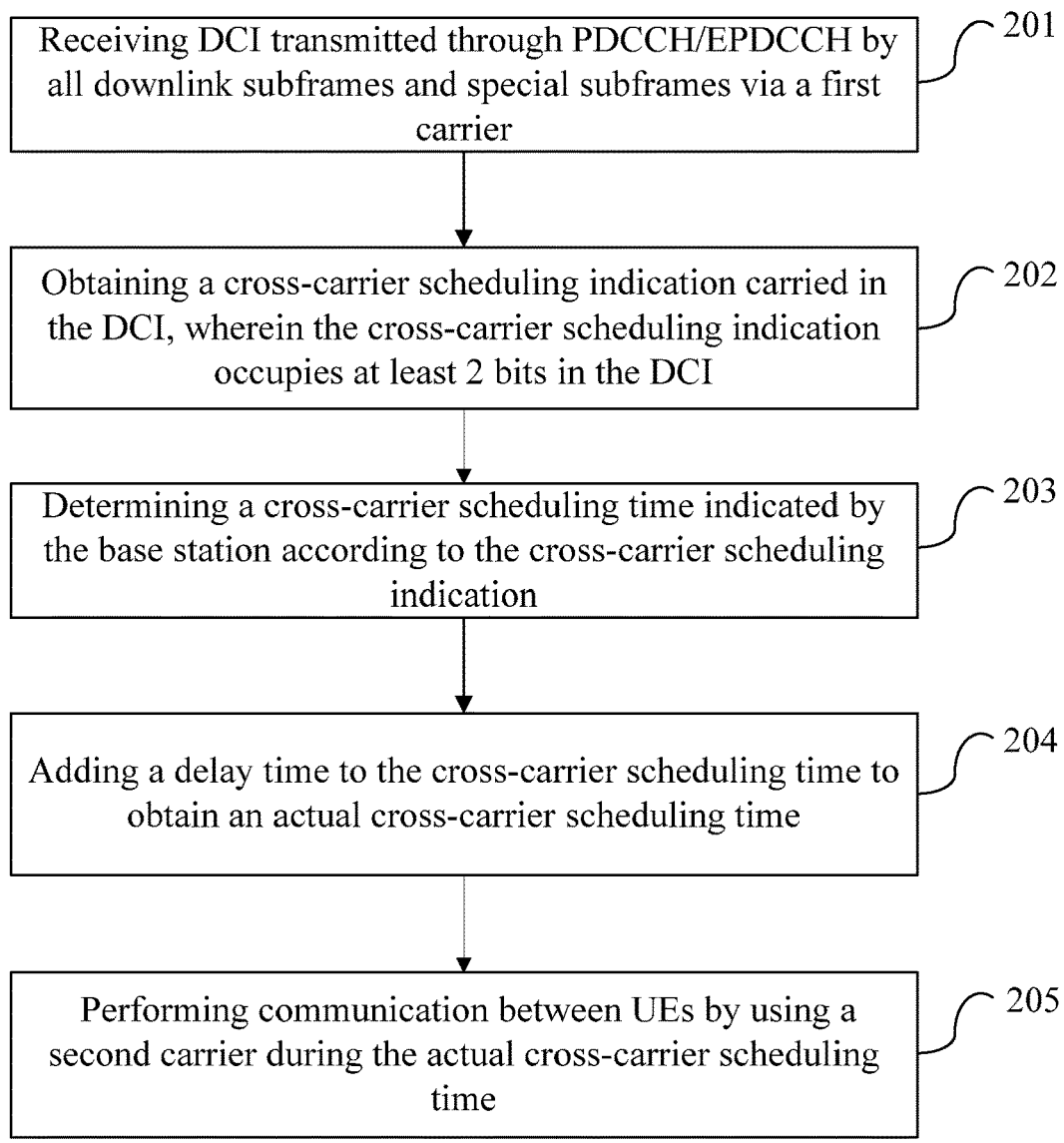
FIG. 6 is a flow chart illustrating steps of a cross-carrier scheduling method according to Second Embodiment of the present disclosure.

As shown in FIG. 6, a cross-carrier scheduling method according to Second Embodiment of the present disclosure comprises:

Step 201, receiving DCI transmitted through PDCCH/EPDCCH by all downlink subframes and special subframes via a first carrier;

Step 202, obtaining a cross-carrier scheduling indication carried in the DCI, wherein the cross-carrier scheduling indication occupies at least 2 bits in the DCI;

Step 203, determining a cross-carrier scheduling time indicated by the base station according to the cross-carrier scheduling indication;

Step 204, adding a delay time to the cross-carrier scheduling time to obtain an actual cross-carrier scheduling time; and Step 205, performing communication between user equipment by using a second carrier during the actual cross-carrier scheduling time.

In the embodiment, all the downlink subframes and special subframes are entitled to a cross-carrier scheduling capability, in which case, with Steps 201 to 205, UE communicates with eNB via a first carrier, and may receive DCI transmitted through PDCCH/EPDCCH by all the downlink subframes and special subframes via the first carrier, and obtain a cross-carrier scheduling indication carried in the DCI, then determine a cross-carrier scheduling time indicated by the eNB according to the cross-carrier scheduling indication, then add a delay time to the cross-carrier scheduling time to obtain an actual cross-carrier scheduling time, and finally use a second carrier, which is used for communication with other UE, to communicate during the actual cross-carrier scheduling time. By adding a delay time to the cross-carrier scheduling time as compensation, the scheduling time is increased in length, thereby improving the system resource utilization.

Taking the same example, UE communicates with eNB by means of TDD, the UE receives a cross-carrier scheduling indication under a Uu carrier; after obtaining an actual cross-carrier scheduling time, the UE communicates with other UE by use of a resource of PC5 carrier dedicated to ITS during the actual cross-carrier scheduling time. As indicated by dashed arrows in FIG. 7, all the downlink subframes and special subframes among Uu subframes under TDD configuration of 5 are capable of performing cross-carrier scheduling in corresponding PC5 subframes.

Figure 7:
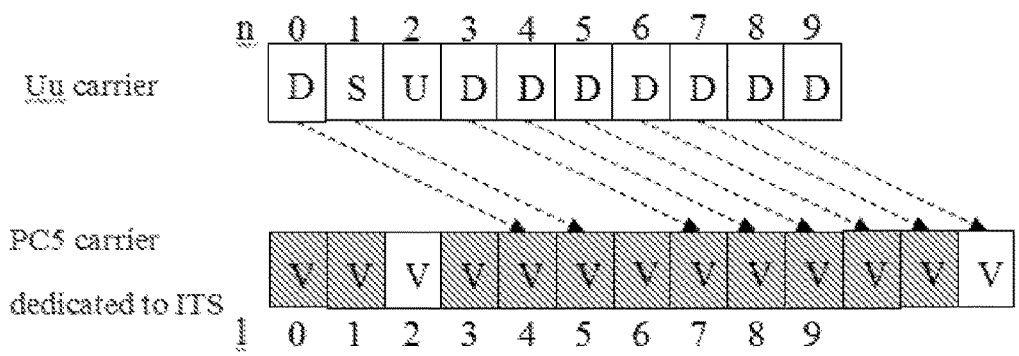
FIG. 7 is a schematic diagram I illustrating scheduling of a transmission subframe structure under TDD configuration of 5 by using the cross-carrier scheduling method according to the First Embodiment of the present disclosure.

In the embodiment, cross-carrier scheduling based on the standards must be performed 4 ms after the DCI sends a subframe, it is unnecessary to determine the cross-carrier scheduling time indicated by the base station according to Table 2 and the received cross-carrier scheduling indication, a cross-carrier scheduling time indicated by the base station corresponding to every cross-carrier scheduling indication is set to a fixed value instead, and a basic delay of cross-carrier scheduling is equal to 4 subframes, that is, k is fixed to 4, as indicated by the dashed arrows in FIG. 7.

As shown in FIG. 6, after the cross-carrier scheduling time is determined, the next step is to add a delay time to the cross-carrier scheduling time so as to obtain an actual cross-carrier scheduling time.

As in the First Embodiment, the cross-carrier scheduling indication occupies at least 2 bits in the DCI, m subframes may be added based on backward adjustment of 4 subframes according to a value of bits occupied by the cross-carrier scheduling indication, that is, the UE communicates with other UE in a PC5 subframe corresponding to a Uu subframe with a subframe number of n+4+m. If the cross-carrier scheduling indication occupies 2 bits in the DCI, a value range of m is [0, 3]; and if the cross-carrier scheduling indication occupies 3 bits in the DCI, a value range of m is [0, 7].

Figure 8:
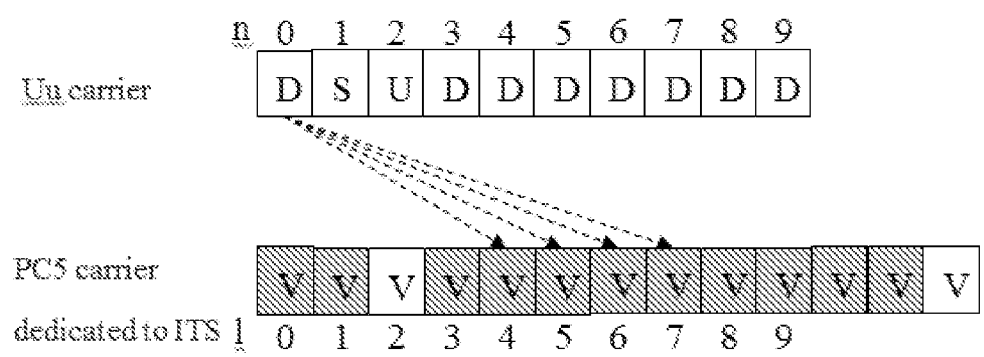
FIG. 8 is a schematic diagram II illustrating scheduling of the transmission subframe structure under TDD configuration of 5 by using the cross-carrier scheduling method according to the First Embodiment of the present disclosure.

In the embodiment, it is possible to preset that the cross-carrier scheduling indication occupies 2 bits in the DCI, and correspondingly a value range of m is [0, 3]. In such case, as shown in FIG. 8, a scheduling range of a Uu subframe with a subframe number n=0 covers PC5 subframes with 1=4 to 1=7, as indicated by dashed arrows in FIG. 8. Each of downlink subframes D and special subframes S among Uu subframes has a similar cross-carrier scheduling capability, so that all the PC5 subframes may be successfully covered by Uu through cross-carrier scheduling.

Figure 9:
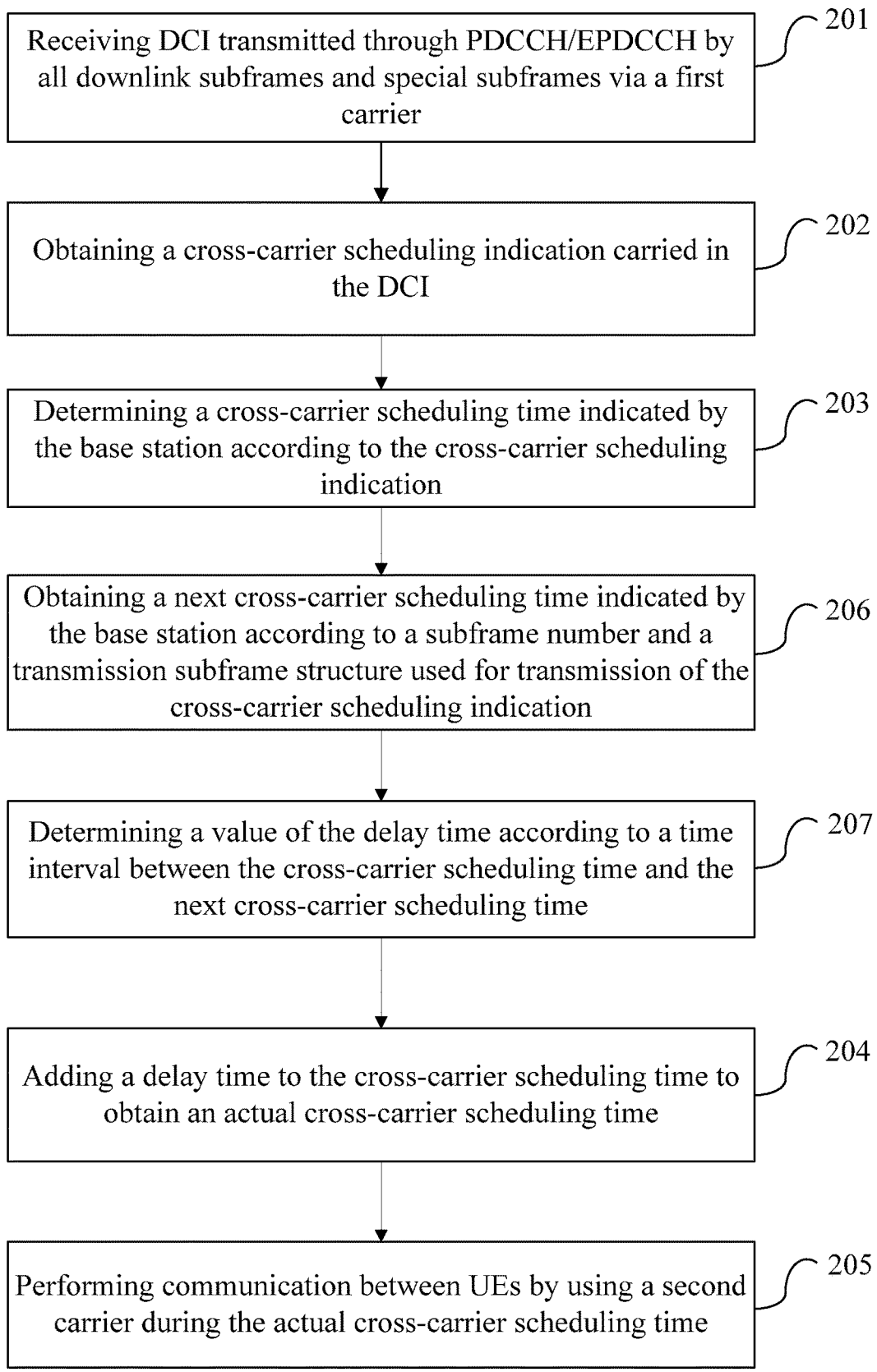
FIG. 9 is a flow chart illustrating specific steps of the cross-carrier scheduling method according to the Second Embodiment of the present disclosure.

Similarly, due to the transmission subframe structures of UE and eNB, a time interval between two consecutive cross-carrier scheduling times indicated by the base station usually fails to reach some larger values of m, for example, there is no subframe between PC5 subframes pointed by two adjacent dashed arrows in FIG. 7. Therefore, as shown in FIG. 9, based on the above embodiment, there are following steps before Step 204:

Step 206, obtaining a next cross-carrier scheduling time indicated by the base station according to a subframe and a structure of transmission frame by which the cross-carrier scheduling indication is transmitted; and Step 207, determining a value of a delay time according to a time interval between the cross-carrier scheduling time and the next cross-carrier scheduling time.

With Steps 206 and 207, a next cross-carrier scheduling time indicated by the base station is first obtained according to the subframe and the structure of transmission frame by which the cross-carrier scheduling indication is received in Step 202, and then a value of a delay time is determined according to a time interval between the cross-carrier scheduling time and the next cross-carrier scheduling time, so as to actualize optimal utilization of system resources.

Referring still to the above example, the cross-carrier scheduling indication currently received is in the downlink subframe D with a subframe number n=0, and it is determined that the cross-carrier scheduling time indicated by the base station is in the subframe by backward adjustment of k=4 subframes, that is, in the subframe with 1=4 pointed by the arrow. In such case, according to a transmission subframe structure shown in FIG. 74, the next cross-carrier scheduling indication received is in a special subframe S with a subframe number n=1, and it is determined that the next cross-carrier scheduling time indicated by the base station is in the subframe by backward adjustment of k=4 subframes, that is, in a subframe with 1=5 pointed by an arrow. There is no subframe between the two cross-carrier scheduling times, so that a maximum value of m is 0, and m is equal to 0. So, when the cross-carrier scheduling indication currently received is in the downlink subframe D with a subframe number n=0, UE may communicate with other UE by use of PC5 resource in a PC5 subframe with 1=4 corresponding to a Uu subframe with a subframe number n+k+m=0+4+0, while communicate with other UE by using PC5 resource in a PC5 subframe with 1=5 with no delay according to the next cross-carrier scheduling indication, which avoids repeated processing.

In summary, according to the cross-carrier scheduling method of the Second Embodiment of the present disclosure, the UE communicates with the eNB via a first carrier, and may receive DCI transmitted through PDCCH/EPDCCH by all the downlink subframes and special subframes via the first carrier, and obtain a cross-carrier scheduling indication carried in the DCI, then determine a cross-carrier scheduling time indicated by the eNB according to the cross-carrier scheduling indication, then add a delay time to the cross-carrier scheduling time to obtain an actual cross-carrier scheduling time, and finally use a second carrier, which is used for communication with other UE, to communicate during the actual cross-carrier scheduling time. By adding a delay time to the cross-carrier scheduling time as compensation, the scheduling time is increased in length and idle resources are effectively used, thereby improving the system resource utilization. Certainly, the cross-carrier scheduling method of the embodiment may also be applied in FDD mode, which will not be described herein.

Third Embodiment

Figure 10:
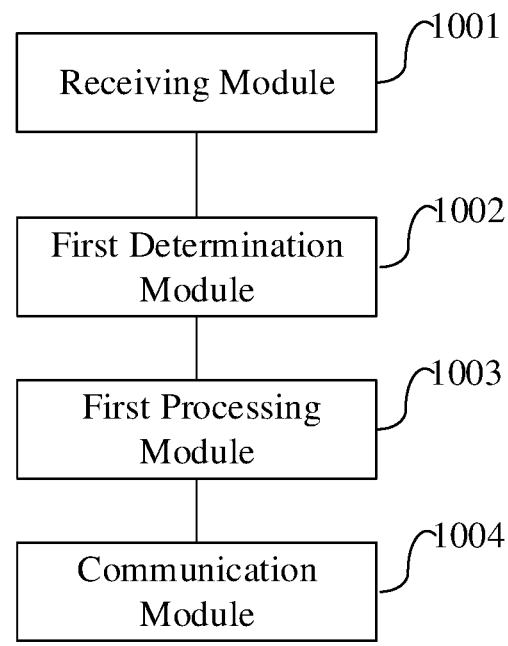
FIG. 10 is a schematic structural diagram of a cross-carrier scheduling device according to Third Embodiment of the present disclosure.

As shown in FIG. 10, a cross-carrier scheduling device according to Third Embodiment of the present disclosure comprises:

a receiving module 1001, configured to receive a cross-carrier scheduling indication transmitted from a base station via a first carrier;

a first determination module 1002, configured to determine a cross-carrier scheduling time indicated by the base station according to the cross-carrier scheduling indication;

a first processing module 1003, configured to add a delay time to the cross-carrier scheduling time to obtain an actual cross-carrier scheduling time; and a communication module 1004, configured to perform communication between user equipment by using a second carrier during the actual cross-carrier scheduling time.

Wherein, the cross-carrier scheduling device further comprises:

a second processing module, configured to obtain a next cross-carrier scheduling time indicated by the base station according to a subframe and a structure of transmission frame by which the cross-carrier scheduling indication is transmitted; and a second determination module, configured to determine a value of a delay time according to a time interval between the cross-carrier scheduling time and the next cross-carrier scheduling time.

Wherein, the receiving module comprises:

a receiving sub-module, configured to receive DCI transmitted through PDCCH/EPDCCH via a first carrier; and an acquisition sub-module, configured to obtain a cross-carrier scheduling indication carried in the DCI, wherein the cross-carrier scheduling indication occupies at least two bits in the DCI.

Wherein, the receiving sub-module comprises:

a receiving unit, configured to receive DCI transmitted through PDCCH/EPDCCH by all downlink subframes and special subframes via a first carrier.

With the cross-carrier scheduling device of the Third Embodiment of the present disclosure, after receiving a cross-carrier scheduling indication transmitted from eNB via a first carrier, UE determines a cross-carrier scheduling time indicated by the base station according to the cross-carrier scheduling indication, then adds a delay time to the cross-carrier scheduling time indicated by the eNB to obtain an actual cross-carrier scheduling time, and finally uses a second carrier to communicate with other user equipment during the actual cross-carrier scheduling time. By adding a delay time to compensate for the cross-carrier scheduling time indicated by the eNB, the scheduling time is increased in length and idle resources are effectively used, thereby improving system resource utilization.

It should be noted that the cross-carrier scheduling device provided by the Third Embodiment of the present disclosure is used for the aforesaid cross-carrier scheduling methods provided by the First Embodiment and the Second Embodiment, and may be used for all embodiments of the aforesaid cross-carrier scheduling methods, with same or similar beneficial effects being produced.

Fourth Embodiment

Figure 11:
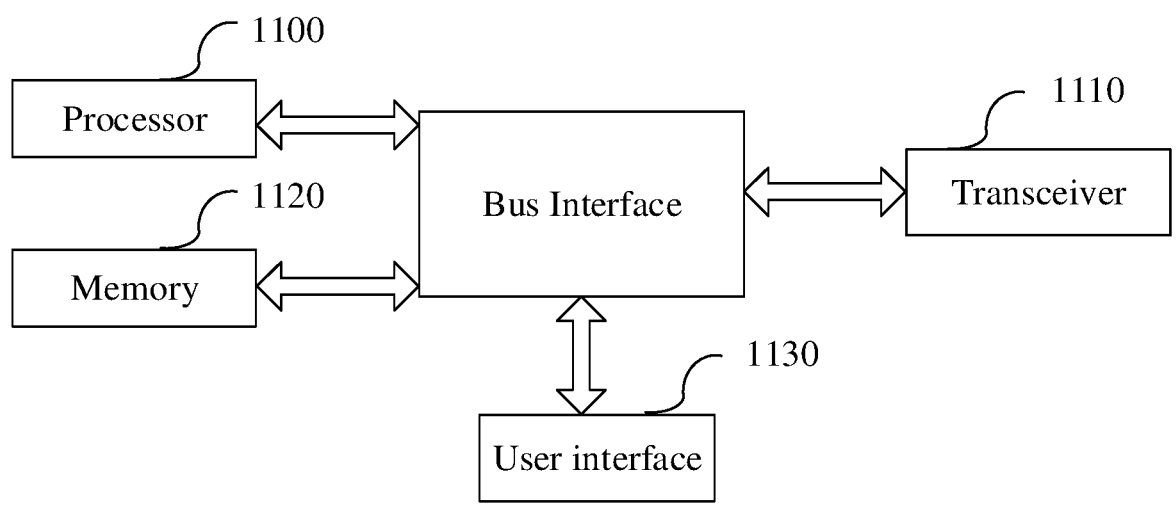
FIG. 11 is a schematic structural diagram of a cross-carrier scheduling device according to Fourth Embodiment of the present disclosure.

For better achieving the above objective, as shown in FIG. 11, Fourth Embodiment of the present disclosure provides a cross-carrier scheduling device, comprising: a processor 1100, a memory 1120 connected with the processor 1100 through a bus interface, and a transceiver 1110 connected with the processor 1100 through the bus interface; the memory is configured to store programs and data used by the processor while performing operations;

the transceiver 1110 is configured to receive a cross-carrier scheduling indication transmitted from a base station via a first carrier;

the processor 1100 is configured to determine a cross-carrier scheduling time indicated by the base station according to the cross-carrier scheduling indication;

the processor 1100 is further configured to add a delay time to the cross-carrier scheduling time to obtain an actual cross-carrier scheduling time; and the transceiver 1110 is further configured to perform communication between user equipment by using a second carrier during the actual cross-carrier scheduling time.

Wherein, in FIG. 11, bus architecture may include any number of interconnected buses and bridges, and specifically link together various circuits of one or more processors represented by the processor 1100 and a memory represented by the memory 1120. The bus architecture may further link together various other circuits of peripheral equipment, voltage stabilizers, power management circuits, and so on, which is well known in the art and thus will not be further described herein. The bus interface provides interfaces. The transceiver 1110 may be a plurality of components, that is, include transmitters and receivers, and provide units used for communication with other devices through transmission media. For different user equipment, a user interface 1130 may be interfaces capable of being externally and internally connected with required devices which include, but are not limited to, small keyboards, displays, speakers, microphones, and joysticks. The processor 1100 is used for managing the bus architecture and general processing, and the memory 1120 may store the data used by the processor 1100 while performing operations.

It should be noted that the cross-carrier scheduling device provided by the Fourth Embodiment of the present disclosure is corresponding to the aforesaid cross-carrier scheduling device provided by the Third Embodiment, so that it may be used for all embodiments of the aforesaid cross-carrier scheduling methods provided by the First Embodiment and the Second Embodiment, with same or similar beneficial effects being produced.

The above is preferred embodiments of the present disclosure. It should be noted that those of ordinary skill in the art may make various improvements and modifications without departing from the principle of the present disclosure, and these improvements and modifications shall be considered to fall into the protection scope of the present disclosure

What is claimed is:

1. A cross-carrier scheduling method, comprising:
    receiving a cross-carrier scheduling indication transmitted from a base station via a first carrier;
    determining a cross-carrier scheduling time indicated by the base station according to the cross-carrier scheduling indication;
    obtaining a next cross-carrier scheduling time indicated by the base station according to a subframe and a structure of transmission frame by which the cross-carrier scheduling indication is transmitted;
    determining a value of a delay time according to a time interval between the cross-carrier scheduling time and the next cross-carrier scheduling time;
    adding the delay time to the cross-carrier scheduling time to obtain an actual cross-carrier scheduling time; and performing communication between user equipment by using a second carrier during the actual cross-carrier scheduling time.

2. The cross-carrier scheduling method according to claim 1, wherein the step of receiving a cross-carrier scheduling indication transmitted from a base station via the first carrier comprises:
receiving Downlink Control Information (DCI) transmitted through Physical Downlink Control Channel (PDCCH)/Enhanced Physical Downlink Control Channel (EPDCCH) via the first carrier; and
obtaining the cross-carrier scheduling indication carried in the DCI, wherein the cross-carrier scheduling indication occupies at least 2 bits in the DCI.

3. The cross-carrier scheduling method according to claim 2, wherein the step of receiving DCI transmitted through PDCCH/EPDCCH via the first carrier comprises:
receiving DCI transmitted through PDCCH/EPDCCH by all downlink subframes and special subframes via the first carrier.

4. The cross-carrier scheduling method according to claim 3, wherein a length of the DCI is determined based on a sum of a basic information bit length under a maximum bandwidth and a preset scheduling bit length, and also based on a maximum value of a maximum format length under a current bandwidth; wherein
the basic information bit length is equal to a length of DCI format 5A, the maximum format length is equal to a length of DCI format 0, and the preset scheduling bit length includes 3 bits of Semi-Persistent Scheduling (SPS) configuration indication and 1 bit of SPS activation/release indication.

5. The cross-carrier scheduling method according to claim 2, wherein a length of the DCI is determined based on a sum of a basic information bit length under a maximum bandwidth and a preset scheduling bit length, and also based on a maximum value of a maximum format length under a current bandwidth; wherein
the basic information bit length is equal to a length of DCI format 5A, the maximum format length is equal to a length of DCI format 0, and the preset scheduling bit length includes 3 bits of Semi-Persistent Scheduling (SPS) configuration indication and 1 bit of SPS activation/release indication.

6. A cross-carrier scheduling device, comprising a transceiver, a processor, and a memory configured to store programs or data used by the processor while performing operations, wherein:
the transceiver is configured to receive a cross-carrier scheduling indication transmitted from a base station via a first carrier;
the processor is configured to determine a cross-carrier scheduling time indicated by the base station according to the cross-carrier scheduling indication, obtain a next cross-carrier scheduling time indicated by the base station according to a subframe and a structure of transmission frame by which the cross-carrier scheduling indication is transmitted, determine a value of a delay time according to a time interval between the cross-carrier scheduling time and the next cross-carrier scheduling time, and add the delay time to the cross-carrier scheduling time to obtain an actual cross-carrier scheduling time; and
the transceiver is further configured to perform communication between user equipment by using a second carrier during the actual cross-carrier scheduling time obtained by the processor.

7. The cross-carrier scheduling device according to claim 6, wherein the transceiver is further configured to receive DCI transmitted through PDCCH/EPDCCH via the first carrier; and obtain the cross-carrier scheduling indication carried in the DCI, wherein the cross-carrier scheduling indication occupies at least two bits in the DCI.

8. The cross-carrier scheduling device according to claim 7, wherein the transceiver is further configured to receive DCI transmitted through PDCCH/EPDCCH by all downlink subframes and special subframes via the first carrier.

9. The cross-carrier scheduling device according to claim 7, wherein a length of the DCI is determined based on a sum of a basic information bit length under a maximum bandwidth and a preset scheduling bit length, and also based on a maximum value of a maximum format length under a current bandwidth; wherein
the basic information bit length is equal to a length of DCI format 5A, the maximum format length is equal to a length of DCI format 0, and the preset scheduling bit length includes 3 bits of Semi-Persistent Scheduling (SPS) configuration indication and 1 bit of SPS activation/release indication.

10. The cross-carrier scheduling device according to claim 8, wherein a length of the DCI is determined based on a sum of a basic information bit length under a maximum bandwidth and a preset scheduling bit length, and also based on a maximum value of a maximum format length under a current bandwidth; wherein
the basic information bit length is equal to a length of DCI format 5A, the maximum format length is equal to a length of DCI format 0, and the preset scheduling bit length includes 3 bits of Semi-Persistent Scheduling (SPS) configuration indication and 1 bit of SPS activation/release indication.

11. A non-transitory computer readable storage medium, on which is stored instructions, the instructions, when executed by a processor, causing the processor to execute the method of claim 1.

* * * * *